US011923751B2

(12) United States Patent
Skliutas et al.

(10) Patent No.: US 11,923,751 B2
(45) Date of Patent: Mar. 5, 2024

(54) POWER SYSTEMS HAVING AN INERTIA ASSEMBLY AND METHODS FOR OPERATION

(71) Applicant: General Electric Company, Schenectady, NY (US)

(72) Inventors: John Paul Skliutas, Clifton Park, NY (US); Paul A. Quail, Clifton Park, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/653,588

(22) Filed: Mar. 4, 2022

(65) Prior Publication Data
US 2023/0283144 A1    Sep. 7, 2023

(51) Int. Cl.
*H02K 7/108*    (2006.01)
*H02K 7/00*    (2006.01)
*H02K 7/02*    (2006.01)
*H02K 7/18*    (2006.01)

(52) U.S. Cl.
CPC ............. *H02K 7/108* (2013.01); *H02K 7/003* (2013.01); *H02K 7/02* (2013.01); *H02K 7/1823* (2013.01)

(58) Field of Classification Search
CPC .......... H02K 7/108; H02K 7/003; H02K 7/02; H02K 7/1823
See application file for complete search history.

(56) References Cited

U.S. PATENT DOCUMENTS

| 6,365,981 | B1 | 4/2002 | Tokita | |
|---|---|---|---|---|
| 7,847,423 | B1 | 12/2010 | Farkas | |
| 2005/0173925 | A1 | 8/2005 | Farkas | |
| 2007/0132244 | A1* | 6/2007 | Chen | F03G 7/10 290/1 R |
| 2012/0228975 | A1* | 9/2012 | Chang | H02K 53/00 310/113 |
| 2013/0241203 | A1 | 9/2013 | Kleen et al. | |
| 2015/0162799 | A1* | 6/2015 | Ilan | F16F 15/03 310/90.5 |
| 2015/0168981 | A1 | 6/2015 | Skliutas et al. | |
| 2021/0344291 | A1* | 11/2021 | Clayton | F01D 15/10 |

FOREIGN PATENT DOCUMENTS

EP    4020741 A1    6/2022

OTHER PUBLICATIONS

European Search Report for application EP23156816.3, dated Aug. 21, 2023; 8 pp.

* cited by examiner

*Primary Examiner* — Joseph Ortega
(74) *Attorney, Agent, or Firm* — Armstrong Teasdale LLP (57) ABSTRACT

A power system includes a turbine assembly including a turbine and a turbine shaft, a generator assembly including a generator and a generator shaft, an inertia assembly including a flywheel coupled to the generator shaft, and a clutch assembly for coupling the turbine shaft to the generator shaft. The clutch assembly is transitionable between a closed state, in which the turbine shaft is coupled to the generator shaft, and an open state, in which the turbine shaft is decoupled from the generator shaft. The power system is operable in a power generation mode when the clutch assembly is in the closed state and a synchronous condenser mode when the clutch assembly is in the open state.

18 Claims, 7 Drawing Sheets

|  | To: Normal-H Power 200 | To: Normal-H Condenser 300 | To: High-H Power 400 | To: High-H Condenser 500 |
|---|---|---|---|---|
| From: Normal-H Power 200 | [not applicable] | B | D | B and D |
| From: Normal-H Condenser 300 | E | [not applicable] | D and E | D |
| From: High-H Power 400 | A | C | [not applicable] | B |
| From: High-H Condenser 500 | A and E | A | E | [not applicable] |

| Procedure Identifier | Procedure Description |
|---|---|
| A | Open Second Clutch Assembly |
| B | Open First Clutch Assembly |
| C | Open First Clutch Assembly and Second Clutch Assembly |
| D | Operate Second Drive Motor to synchronize Flywheel Shaft with Second Clutch Assembly, and Closing Second Clutch Assembly |
| E | Operate First Drive Motor to synchronize Turbine Shaft with First Clutch Assembly, and Close First Clutch Assembly |

POWER SYSTEMS HAVING AN INERTIA ASSEMBLY AND METHODS FOR OPERATION

BACKGROUND

The present disclosure relates generally to power systems having an inertia assembly for use with an electrical transmission grid, and more particularly, to power systems that are operable in a plurality of different inertia modes.

At least some known power systems include power generators having a generator and a turbine that rotates a rotor of the generator to provide power to the grid. At least some other known power systems include synchronous condensers. The synchronous condensers may be used to adjust conditions on the grid, for example by generating or absorbing reactive power to adjust the grid's voltage, providing short circuit current, providing reactive power overload capability, and/or to add inertia to the grid.

In at least some known power generators, the turbines are fixed to the rotor shaft such that the turbines may not be easily disconnected from the generators. As such, at least some known power generation systems are provided as separate facilities or systems on the grid. For example, a single plant may act as a power generation plant and an entirely separate facility on the grid may act as a synchronous condenser facility. Additionally, separate generators are generally required for the synchronous condenser systems and power generation systems. Likewise, while at least some known synchronous condensers may include an inertia assembly, such as a flywheel, such assemblies are typically not disconnected.

BRIEF DESCRIPTION

In one aspect a power system is provided. The power system includes a turbine assembly including a turbine and a turbine shaft, a generator assembly including a generator and a generator shaft, an inertia assembly including a flywheel coupled to the generator shaft, and a clutch assembly for coupling the turbine shaft to the generator shaft. The clutch assembly is transitionable between a closed state, in which the turbine shaft is coupled to the generator shaft, and an open state, in which the turbine shaft is decoupled from the generator shaft. The power system is operable in a power generation mode when the clutch assembly is in the closed state and a synchronous condenser mode when the clutch assembly is in the open state.

In another aspect, a method of operating a power system is provided. The method includes coupling, by transitioning a clutch assembly to a closed state, a turbine shaft of a turbine assembly to a generator shaft of a generator assembly, the generator shaft being coupled to a flywheel of an inertia assembly. The method further includes operating the power system in a power generation mode while the clutch assembly is in the closed state. The method further includes opening the clutch assembly into an open state to decouple the turbine shaft from the generator shaft and the flywheel and operating the power system in a synchronous condenser mode while the clutch assembly is in the open state.

In yet another aspect, a power system is provided. The power system includes a turbine assembly including a turbine and a turbine shaft, a generator assembly including a generator and a generator shaft, the generator shaft extending from a first end to a second, opposed end, and an inertia assembly including a flywheel coupled to a flywheel shaft. The power system further includes a first clutch assembly operable to couple the turbine shaft to the first end of the generator shaft; and a second clutch assembly operable to couple the flywheel shaft to the second end of the generator shaft. The power system is operable in a power generation mode when the first clutch assembly is closed and a synchronous condenser mode when the first clutch assembly is open.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

It should be noted that, as used herein, the term "couple" is not limited to a direct mechanical, thermal, electrical, and/or flow communication connection between components, but may also include an indirect mechanical, thermal, electrical, and/or flow communication connection between multiple components.

As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated circuit, and/or other programmable circuits, and such terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, for example, but not be limited to, a scanner. Furthermore, in the embodiments described herein, additional output channels may include, but are not limited to only being, an operator interface monitor.

While the present disclosure is described herein with illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The systems described herein relate to power systems that include an inertia assembly and a clutch assembly operable to transition the power system between a power generation mode and a synchronous condenser mode. Specifically, in the example embodiment, the power system includes a turbine assembly including a turbine and a turbine shaft, a generator assembly including a generator and a generator shaft, and an inertia assembly including a flywheel coupled to the generator shaft. A clutch assembly is also provided for coupling the turbine shaft to the generator shaft. The clutch assembly is transitionable between a closed state, in which the turbine shaft is coupled to the generator shaft, and an open state in which the turbine shaft is decoupled from the generator shaft. The power system is operable in a power generation mode when the clutch assembly is in the closed state and a synchronous condenser mode when the clutch assembly is in the open state.

In the example embodiment, the power system may be selectively operated in a power generation or in a synchronous condenser mode by controlling the clutch assembly. The clutch assembly couples the turbine shaft to the generator shaft when the power system is in the power generation mode and is controllable to decouple the turbine shaft from the generator to operate the power system in a synchronous condenser mode. Furthermore, the inertia assembly is able to provide increased inertia to the grid. Thus the power systems provide flexibility to operate the power system in different modes according to the changing needs of the grid.

Figure 1:
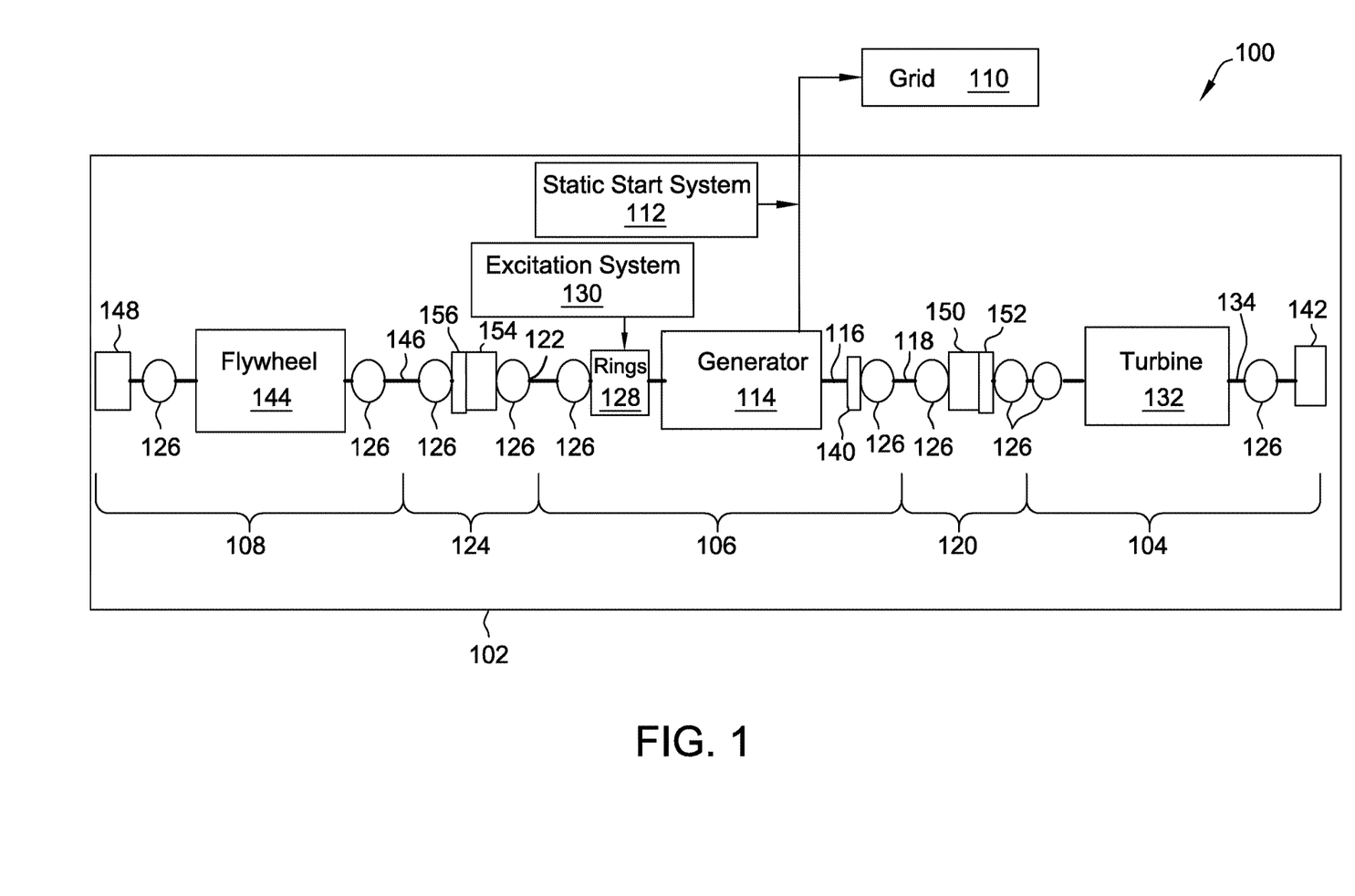
FIG. 1 is a schematic view of an example power system.

FIG. 1 is a schematic view of an example power system 100 in accordance with the present disclosure. In the example embodiment, power system 100 includes a power plant 102 containing a turbine assembly 104, a generator assembly 106, and an inertia assembly 108. Power system 100 could be referred to as any one of: a grid support device, hybrid flex power plant, flex H condenser power plant, or any other suitable power plant. Power system 100 is electrically connected to an electrical transmission grid network 110 (also referred to herein as a "grid" or "power grid"). In the example embodiment, power system 100 further includes a static start system 112 for starting generator assembly 106. In other embodiments, power system 100 does not include static start system 112.

Generator assembly 106 includes a generator 114 having a rotor (not shown) mounted to a generator shaft 116 and positioned within a stator (not shown). The rotor produces a constant magnetic field and interacts with windings of the stator, which are fed by a system of three-phase AC voltages. In the example embodiment, generator shaft 116 is a single-piece shaft that extends from a first end 118 coupled to a first clutch assembly 120 and a second end 122 coupled to a second clutch assembly 124. Generator assembly 106 further includes a pair of steady bearings 126 coupled to generator shaft 116 and positioned proximate the first and second ends 118, 122, respectively, of generator shaft 116. A thrust bearing 140 is coupled to generator shaft 116 proximate first end 118.

In the example embodiment, generator assembly 106 further includes excitation rings 128 proximate second end 122 of generator shaft 116. Excitation rings 128 are configured to receive excitation current generated from an excitation system 130. In the example embodiment, excitation rings 128 are slip rings and may include a positive terminal collector ring and a negative terminal collector ring (not shown). Excitation system 130 may include any suitable (e.g., commercially available) exciter that can provide an excitation supply used for generating DC power. In other embodiments, a brushless exciter assembly (not shown) may be used instead of the excitation system 130 and rings 128. For example, smaller generators often use a brushless exciter instead of an excitation system 130 and rings 128. In some such embodiments, the brushless exciter is a small ac alternator with diodes to rectify the ac into dc or a small direct current electrical machine that is situated proximate second end 122 of generator shaft 116. In some such embodiments, generator 114 may be started in combination with the flywheel assembly 108 and/or the turbine assembly 104 by the respective motors 142, 148, as described in greater detail below.

Turbine assembly 104 includes a turbine 132 and a turbine shaft 134. In the example embodiment, turbine 132 is a gas turbine that also includes a combustor and a compressor (not shown) for driving rotation of turbine shaft 134. Although the present disclosure describes a thermal power plant 102 including a gas powered turbine, it will be understood that the concepts described herein are not limited to thermal power plants and/or gas turbines, but may instead alternatively be incorporated into different power plants or power generation devices, such as, for example, a steam turbine, a hydro turbine, a wind turbine, or any suitable power generating turbine. In some embodiments where turbine 132 is a wind turbine, the wind turbine may also be controlled to generate virtual inertia.

Turbine 132 is configured to drive rotation of turbine shaft 134 during operation. A steady bearing 126 is coupled to turbine shaft 134 between turbine 132 and first clutch assembly 120. Turbine assembly 104 further includes a first drive motor 142 coupled to turbine shaft 134 and operable to drive the turbine shaft 134 up to a synchronization speed with generator shaft 116, as described in greater detail below. A steady bearing 126 is coupled to turbine shaft 134 between turbine 132 and first drive motor 142. In other embodiments, thrust bearing 140 may be coupled to turbine shaft 134.

Inertia assembly 108 includes a flywheel 144 and a flywheel shaft 146. Flywheel shaft 146 is coupled to a pair of steady bearings 126 of inertia assembly 108 for controlling vibration of flywheel shaft 146. Flywheel shaft 146 is further is coupled to flywheel 144 for rotation with flywheel 144. Flywheel 144 is configured to store and recover kinetic energy in conjunction with generator assembly 106, and turbine 132, if connected. Flywheel 144 may include any suitable rotating mass (not shown) coupled to flywheel shaft 146. Inertia assembly 108 may further include one or more of a vacuum sealing, a vacuum pressure casing for containing flywheel 144, one or more cooling systems, and/or other suitable sub-assemblies (not shown). Inertia assembly 108 further includes a second drive motor 148 coupled to flywheel shaft 146 and operable to drive the flywheel shaft 146 up to a synchronization speed with generator shaft 116, as described in greater detail below. In the example embodiment, first drive motor 142 and second drive motor 148 each include a pony motor and a variable speed drive (not shown), though in other embodiments, any suitable drive motors may be used. In other embodiments, either or both of inertia assembly 108 and turbine assembly 104 do not include the corresponding drive motors 142, 148.

First clutch assembly 120 is operable to selectively couple generator shaft 116 to turbine shaft 134. First clutch assembly 120 includes a pair of steady bearings 126, a first lockable clutch 150, and a first turning gear 152. First turning gear 152 is positioned between turbine 132 and first lockable clutch 150. Second clutch assembly 124 is operable to selectively couple flywheel shaft 146 to generator shaft 116. In the example embodiment, second clutch assembly 124 is substantially the same as first clutch assembly 120 except that it is mirrored across generator assembly 106. That is, second clutch assembly 124 also includes a pair of steady bearings 126, a second lockable clutch 154, and a second turning gear 156 positioned between flywheel 144 and second lockable clutch 154.

In the example embodiment, first clutch assembly 120 and second clutch assembly 124 are each selectively transitionable between a closed state and an open state to change an operating mode of the power system 100. In particular, first clutch assembly 120 is operable to change power system 100 between operation of the system 100 as a power generator in a power generation mode (also referred to herein as a "power mode") and operation of the system 100 as a synchronous condenser in a synchronous condenser mode (also referred to herein as a "condenser mode"). Second clutch assembly 124 is operable to change power system 100 between a low or standard inertia mode and a high inertia mode.

In the example embodiment, first clutch assembly 120 and second clutch assembly 124 each include an input section and an output section (not shown) and are transitionable between the open state and the closed state. In the some embodiments, the input and output sections may be engaged to close the clutch assemblies 120, 124 by rotating the input and output sections at substantially the same speed. For example, if the output section is spinning faster than the input section the clutch will remain open. Once the input and output are substantially the same speed, the clutch assembly 120, 124 will close and remain closed until the speeds differ again. Moreover, in the example embodiment, the clutch assemblies 120, 124 are transitionable between a locked state and an unlocked state. In the unlocked state, power may be driven from the input section to the output section but not from the output section to the input section. When locked, the clutch assemblies 120, 124 can drive power from the output section to the input sections. As used herein, "closing" the clutch assemblies 120, 124 may include both transitioning the clutch assemblies to the closed state and the locked state. Additionally, "opening" the clutch assemblies 120, 124 may include both transitioning the clutch assemblies to the unlocked state and the open state. In some embodiments, the input section of first clutch assembly 120 is coupled to turbine shaft 134 and the output section of first clutch assembly 120 is coupled to generator shaft 116. Additionally, in some such embodiments, the input section of second clutch assembly 124 is coupled to generator shaft 116 and the output section of second clutch assembly 124 is coupled to flywheel shaft 146. In other embodiments, the input sections and output sections of clutch assembles 120, 124 may be configured in anyway that enables power system 100 to function as described herein.

FIGS. 2-5 show power system 100 in different operating modes. Rotation arrows shown in FIGS. 2-5 indicate rotational movement of respective shafts 116, 134, 146 in the illustrated operating modes.

Figure 2:
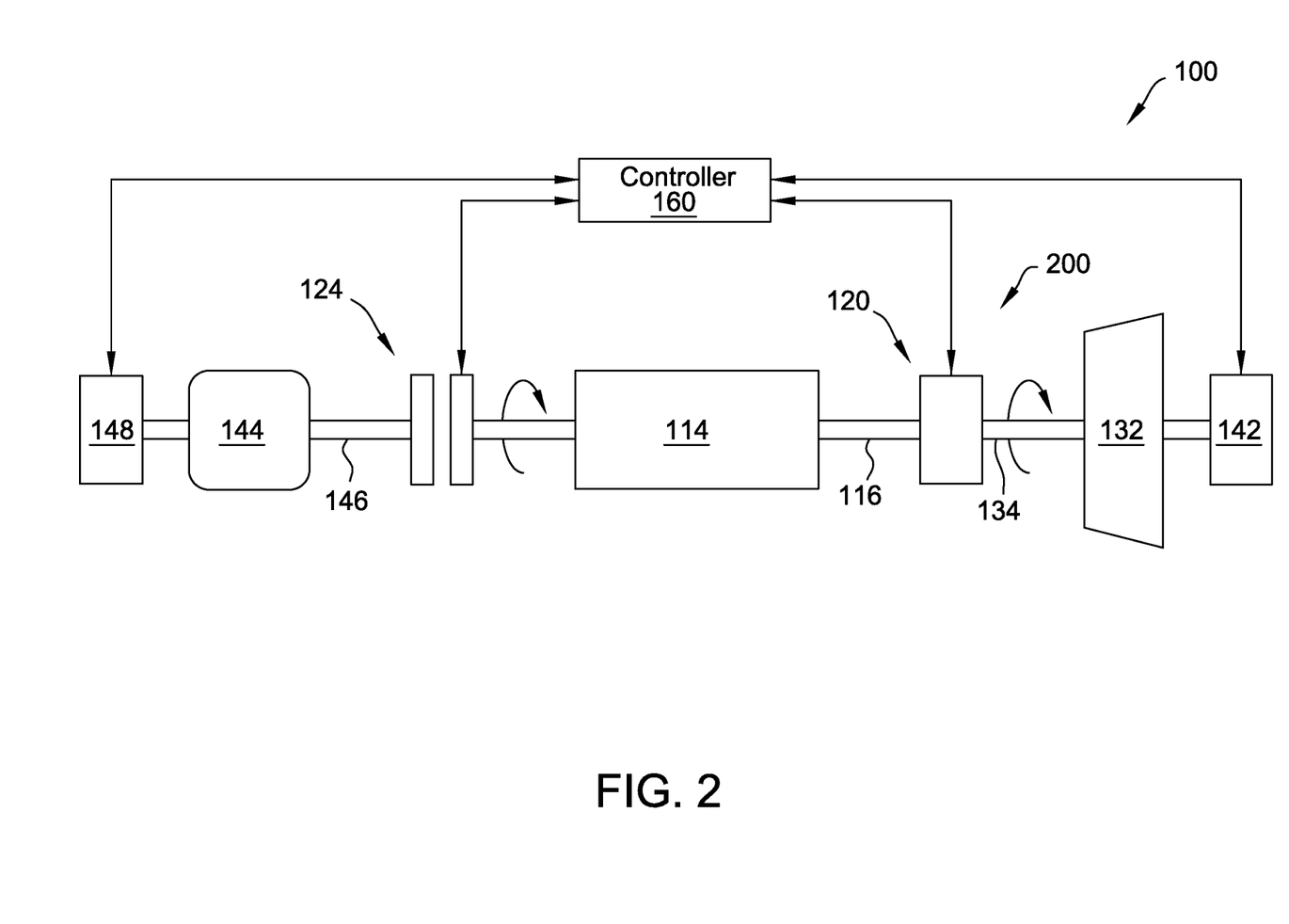
FIG. 2 is another schematic view of the example power system of FIG. 1, showing the power system in a first operating mode.

Referring to FIG. 2, power system 100 is in a standard inertia power mode 200. In particular, first clutch assembly 120 is in a closed state and turbine shaft 134 is coupled to generator shaft 116 for driving rotation of the generator shaft 116. In the mode 200, generator shaft 116 and turbine shaft 134 are each rotating and flywheel shaft 146 is not rotating. When operating in the power generation mode, generator 114 provides power to the power grid 110 (shown in FIG. 1) by rotation of the generator shaft 116 and corresponding electromagnetic interaction of the generator rotor with the stator (not shown). Additionally, in the example of FIG. 2, second clutch assembly 124 is in the open state and generator shaft 116 is decoupled from flywheel shaft 146, providing standard inertia (i.e., without added inertia of the flywheel 144).

Figure 3:
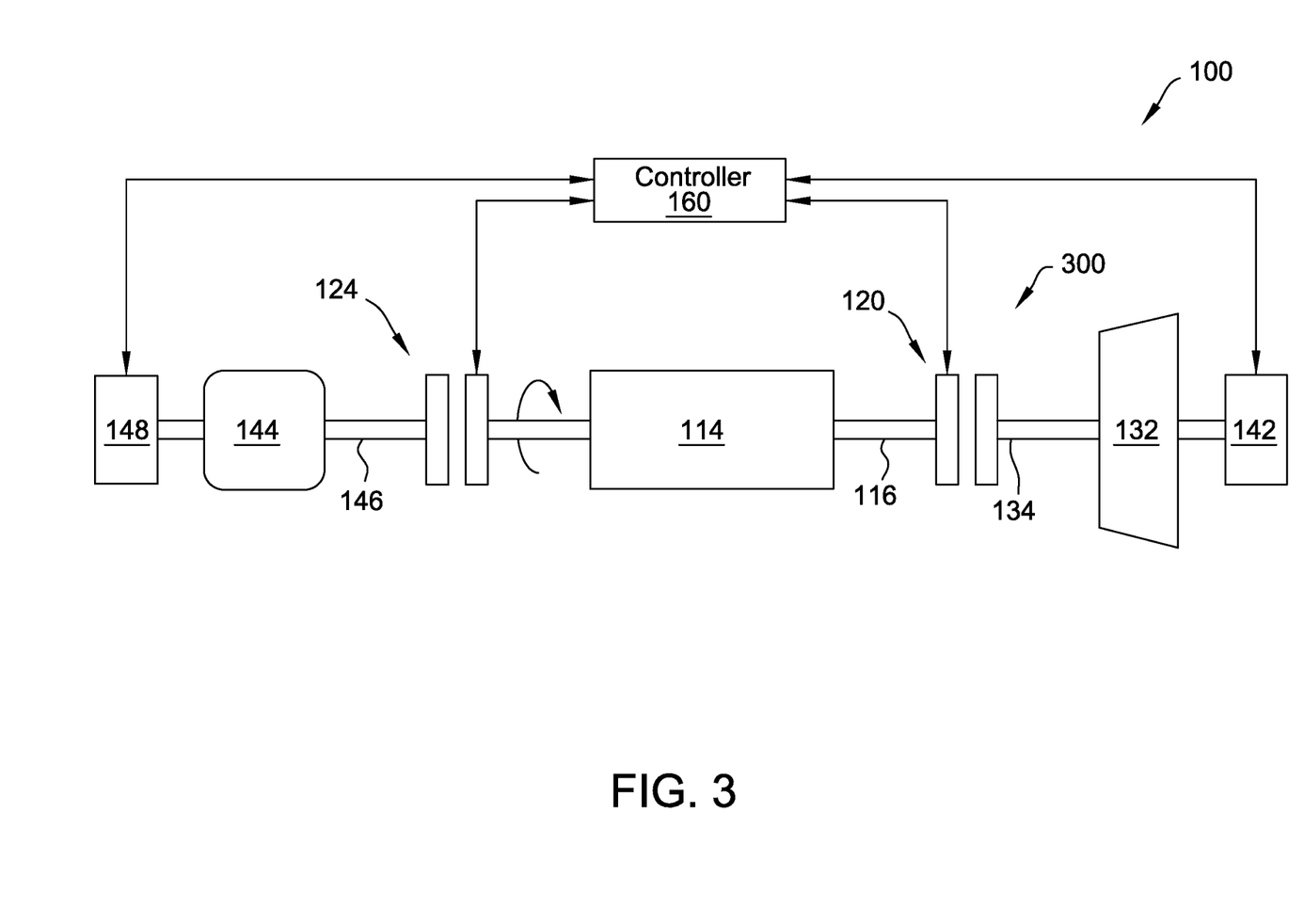
FIG. 3 is a schematic view of the power system of FIG. 1, showing the power system in a second operating mode.

Referring to FIG. 3, power system 100 is in a standard inertia condenser mode 300. In the example embodiment first clutch assembly 120 is in an open state and turbine shaft 134 is decoupled from generator shaft 116. In the embodiment of FIG. 3, generator 114 may act as a synchronous condenser on the power grid 110. When operating in the synchronous condenser mode, generator 114 may regulate conditions of the electric power transmission grid (shown in FIG. 1), such as by generating or absorbing reactive power. For example, during periods of high renewable power generation, the need for power system 100 to be generating power is reduced and it may be desirable to instead run power system 100 in one of the synchronous condenser modes 300, 500 for regulating the voltage in the grid 110 by reducing voltage fluctuations and to provide short-circuit support. Additionally, in the example of FIG. 3, second clutch assembly 124 is in the open state and generator shaft 116 is decoupled from flywheel shaft 146. In the mode 300, generator shaft 116 is rotating and flywheel shaft 146 and turbine shaft 134 are each not rotating.

In the example embodiment, second clutch assembly 124 is selectively controllable to change an inertia level of the power system 100. For example, when second clutch assembly 124 is in an open state, as shown in FIGS. 2 and 3, flywheel shaft 146 is decoupled from generator shaft 116 and power system 100 is operable in the standard inertia mode.

Figure 4:
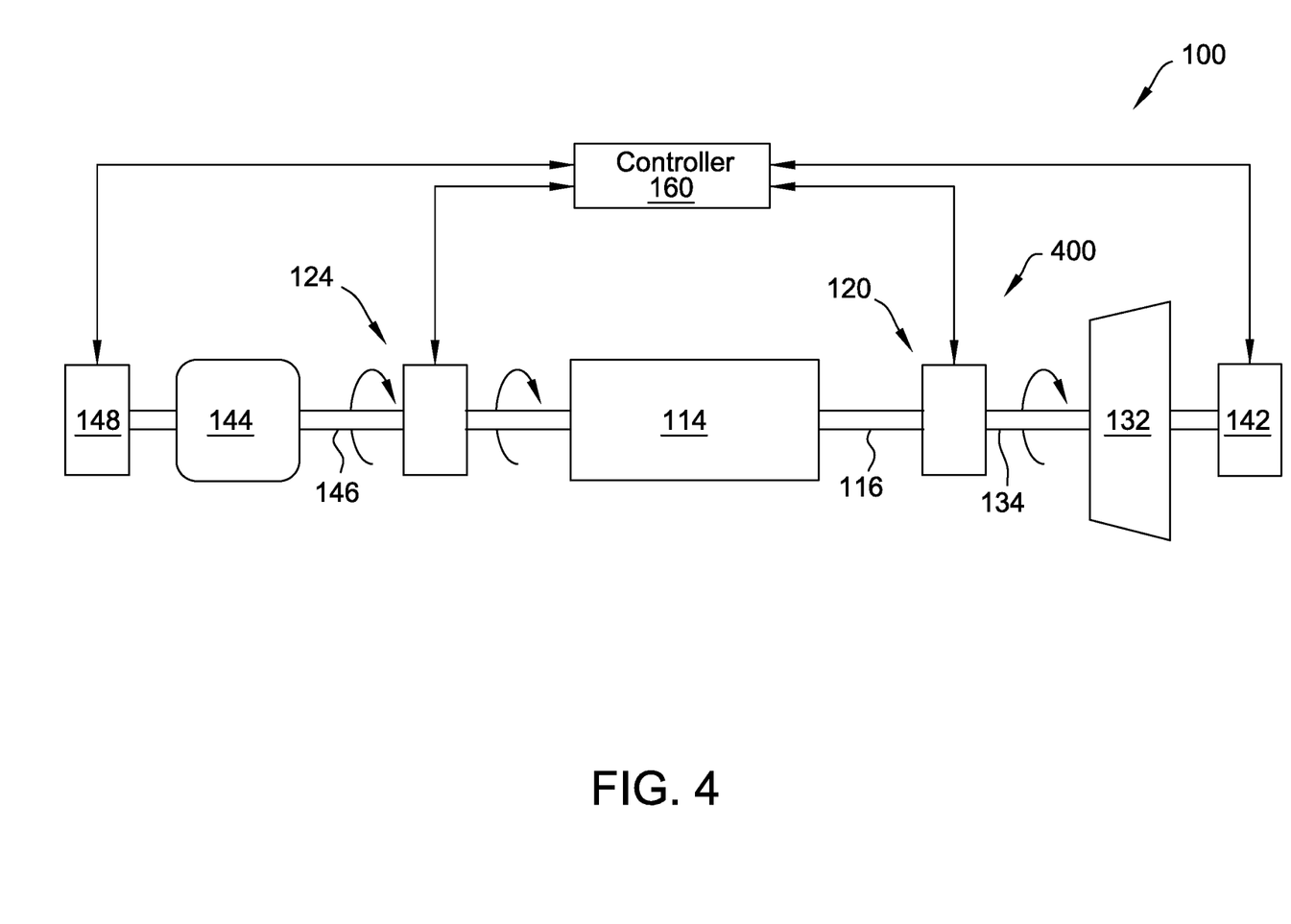
FIG. 4 is a schematic view of the power system of FIG. 1, showing the power system in a third operating mode.

Referring to FIG. 4 power system 100 is in a high inertia power mode 400. In particular, in FIG. 4, first clutch assembly 120 and second clutch assembly 124 are each in the closed state and power system 100 is in a power generation mode and a high inertia mode. In the high inertia mode, flywheel shaft 146 is coupled to generator shaft 116 such that rotation of the generator shaft 116 also causes rotation of the flywheel shaft 146 (and vice versa). As a result, the inertia of power system 100 is increased when operating in the high inertia mode. In the mode 400, each of generator shaft 116, flywheel shaft 146, and turbine shaft 134 are rotating.

Figure 5:
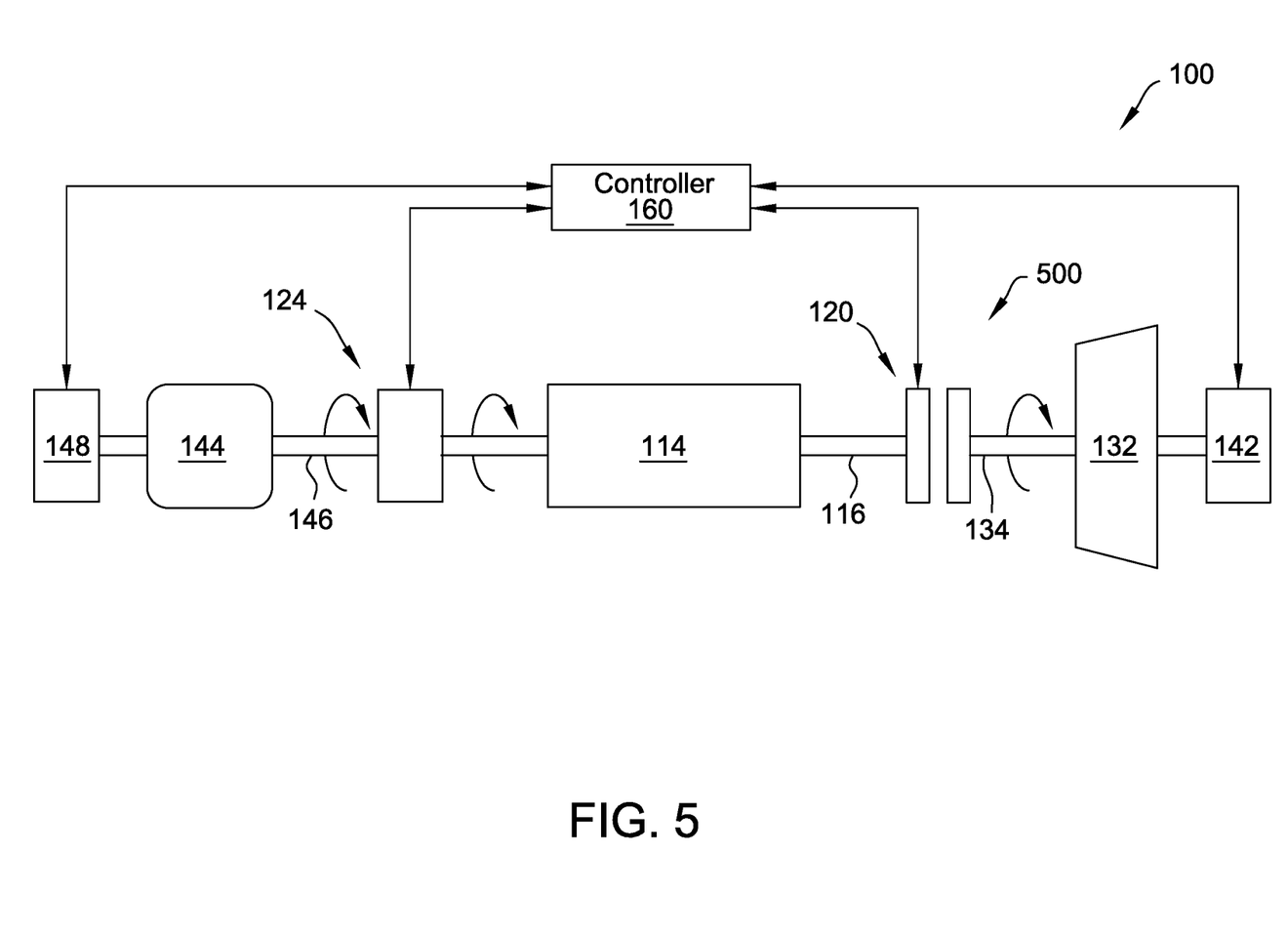
FIG. 5 is a schematic view of the power system of FIG. 1, showing the power system in a fourth operating mode.

Referring to FIG. 5, power system 100 is in a high inertia condenser mode 500. In particular, first clutch assembly 120 is in the open state and second clutch assembly 124 is in the closed state. In the mode 500, generator shaft 116, and flywheel shaft 146 are each rotating and turbine shaft 134 is not rotating.

The change in the inertia of power system 100 between the standard inertia modes and the high inertia modes may be represented by a change in the inertia constant H of the power system. The inertia constant H is calculated according to the equation (1), provided below:

$$H = \frac{\text{(Kinetic energy at rated speed)}}{V A base} = \frac{1}{2} \frac{J\omega 2}{V A base}; \quad \text{Eq. (1)}$$

where, H is the Inertia constant in Megawatt seconds per Mega Volt Ampere ("MWs/MVA"). J is equal to Moment of Inertia in kilogram meter squared (kgm$^2$), ω is equal to the nominal speed of rotation in radians/seconds, and VAbase is equal to the MVA rating of generator 114. In some embodiments, the inertia constant H of power system 100 when operating in one of the power generation modes may be in the range of 2 MWs/MVA and 10 MWs/MVA, depending on construction of power system 100 and fuel type used to power turbine assembly 104.

In the example embodiment, when considering power plant operation, the high inertia mode may increase an inertia constant H of the power system 100, as compared to the standard inertia mode, by a factor of at least 1.25, at least 1.5, or at least 1.75 depending upon, e.g., the characteristics of flywheel 144 and other operating parameters. In the example embodiment, when operating in the high inertia power generation mode 400 (i.e., with the use of flywheel 144), the inertia constant H is increased by a factor of 2 relative to the standard inertia power generation mode 200. More specifically, in the example embodiment, when operating in the standard inertia mode power generation mode 200, the inertia constant H of the power system 100 is approximately 5 MWs/MVA, based on an inertia constant H of 2 MWs/MVA for generator 114 and 3 MWs/MVA for turbine 132. Additionally, in the example embodiment, the inertia constant H of flywheel 144 is 5 MWs/MVA. As a result, when operating in the high inertia power generation mode 400, the inertia constant H of the power system 100 is approximately 10 MWs/MVA. In other words, by operating in the high inertia mode, power system 100 is able to provide the same amount of inertia to the power grid 110 that would otherwise normally require two power plants.

Use of flywheel 144 may have an even greater impact on the inertia constant H during synchronous condenser operation. For example, in the example embodiment, when operating in the standard inertia synchronous condenser mode 300, the inertia constant H of the power system 100 is approximately between 1 and 2 MWs/MVA, based on the properties of generator 114. When operating in the high inertia synchronous condenser mode 500, the inertia constant H of the power system 100 is approximately between 5 and 10 MWs/MVA, or, more specifically in the example embodiment, 7 MWs/MVA based on the added 5 MWs/MVA provided by flywheel 144. As a result, when operating in the high inertia condenser mode 500, the inertia constant H is increased by a factor of at least 2.5, at least 5, or at least 10, relative to the standard inertia condenser mode 300. In the example embodiment, when operating in the high inertia condenser mode 500, the inertia constant H is increased by a factor of 3.5, relative to the standard inertia condenser mode 300.

In other embodiments, power system 100 does not include second clutch assembly 124 and flywheel shaft 146 is not configured for selective decoupling from generator shaft 116. For example, in some such embodiments, flywheel shaft 146 and generator shaft 116 may be provided as a single shaft. In such embodiments, flywheel 144 is operated regardless of whether system 100 is in a power generation operating mode or a synchronous condenser operating mode and system 100 is not transitionable to a lower inertia operating mode.

In the example embodiment, power system 100 further includes a controller 160 coupled in communication with first clutch assembly 120 and second clutch assembly 124. Controller 160 is a computer system that includes at least one processor (not shown) and at least one memory device (not shown). The memory device may include a non-transitory computer-readable medium and program that are accessed by the processor to execute operations to control one or more subsystems of power system 100. In the example embodiment, controller 160 is communicatively coupled to first clutch assembly 120, second clutch assembly 124, first drive motor 142, and second drive motor 148.

Controller 160 is configured to selectively control the respective clutch assemblies 120, 124 to transition between the open state and the closed state during operation. In some embodiments, first clutch assembly 120 and second clutch assembly 124 each include an actuator (not shown) coupled in communication with controller 160 and configured to drive the respective clutch assemblies between the open state and the closed state. Although not illustrated in FIGS. 2-5, it will be understood that controller 160 is also communicatively coupled to other controllable subsystems of power system 100, such as static start system 112 and excitation system 130 (shown in FIG. 1).

In some embodiments, controller 160 may further be configured to automatically switch power system 100 between the different operating modes based on one or more triggers being satisfied. For example, in some embodiments, controller 160 is configured to monitor power grid conditions, such as usage, voltage volatility, demand, price, etc. and determine a desired operating mode of power system 100 based on the detected grid conditions. As one example, in some embodiments, controller 160 may automatically switch power system 100 from the standard inertia power mode to the high inertia condenser mode 500 based on the detected grid conditions. Moreover, in some embodiments, controller 160 may automatically switch operating modes of power system 100 based on time periods of the day that are associated with high levels of renewable energy generation. For example, in some embodiments, controller 160 may automatically switch power system 100 from one of the power generation modes 200, 400 to one of the synchronous condenser modes 300, 500 during midday, when solar energy production is at its peak.

Controller 160 is further configured to control drive motors 142, 148 to allow for switching the operating mode of power system 100 without shutting down generator 114. For example, when operating in one of the synchronous condenser modes (e.g., as shown in FIGS. 3 and 5), to switch to a power generation mode, first drive motor 142 may be controlled to drive turbine shaft 134 up to a rotational velocity that substantially matches or is synchronized with the rotational velocity of generator shaft 116 to enable closing first clutch assembly 120. Additionally, second drive motor 148 may controlled in substantially the same manner with respect to flywheel shaft 146 when switching from one of the standard inertia modes to one of the high inertia modes (e.g., as shown in FIGS. 4 and 5). In some embodiments, controller 160 may also be configured to receive commands from a remote dispatch facility or grid operator (not shown) and to control power system 100 based on the received commands.

Figure 6:
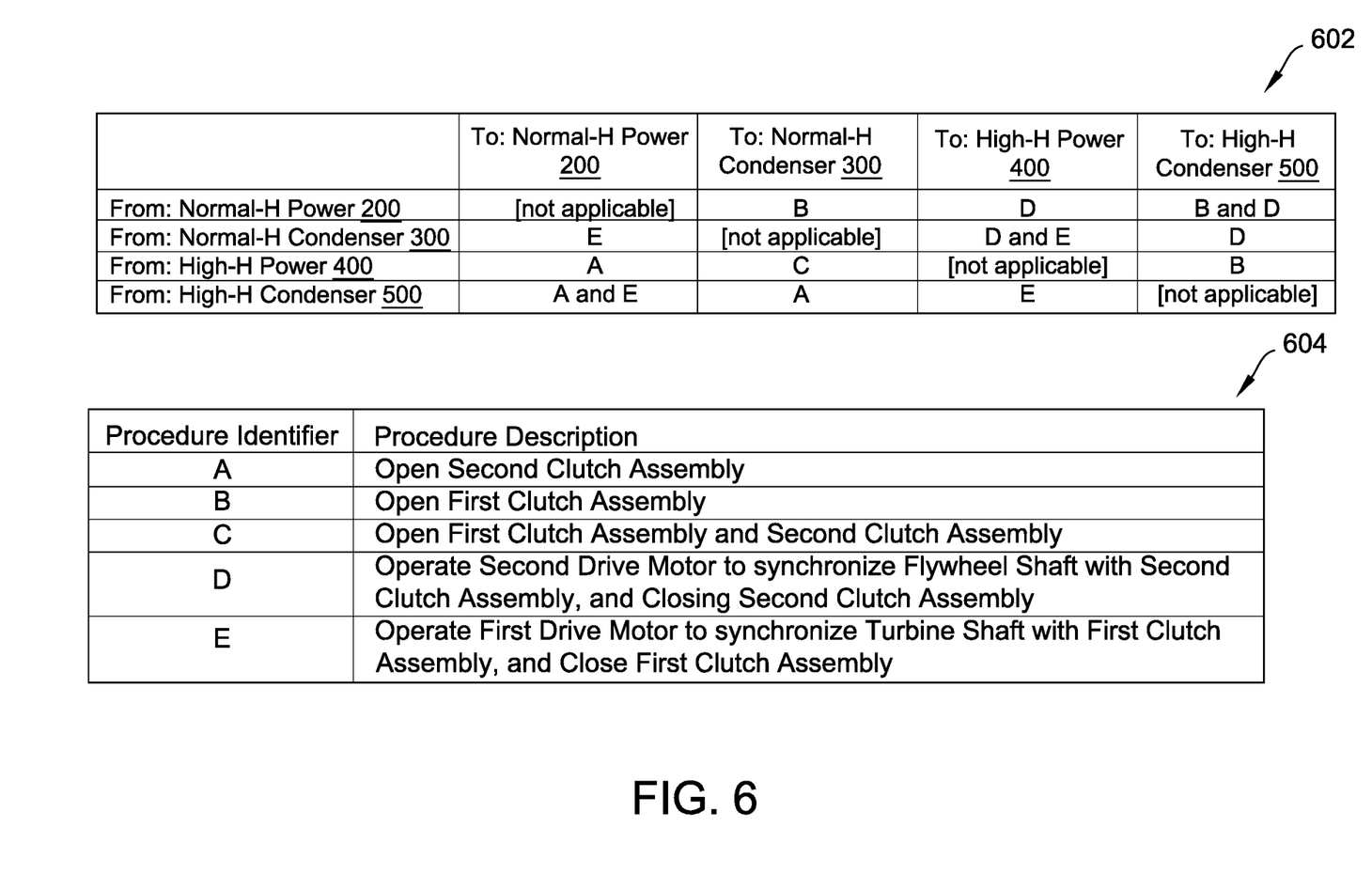
FIG. 6 is an operating table for controlling the power system of FIGS. 1-5.

FIG. 6 shows an example of tables for determining procedures to change the operating mode of power plant 102. In particular, in the example embodiment, power system 100 is configured to transition between the different operating modes 200-500 (shown in FIGS. 2-5) without shutting down power system 100 (i.e., without stopping or substantially slowing down rotation of generator shaft 116). A first table 602 shows procedure identifiers used for changing the plant between one of the operating modes 200-500 to another one of the operating modes 200-500. A second table 604 provides a description of the procedures associated with the procedure identifiers used in first table 602.

The first row of first table 602 illustrates procedures for switching from operation in the normal inertia power mode 200 to each of the other modes. In the example embodiment, power system 100 is switched to the normal inertia condenser mode by opening first clutch assembly 120. In the example embodiment, power system 100 is switched to the high inertia power mode 400 by operating second drive motor 148 to synchronize flywheel shaft 146 with second clutch assembly 124, and then closing second clutch assembly 124. In the example embodiment, power system 100 is switched to the high inertia condenser mode 500 by opening first clutch assembly 120 and also operating second drive motor 148 to synchronize flywheel shaft 146 with second clutch assembly 124, then closing second clutch assembly 124.

The second row of first table 602 illustrates procedures for switching from operation in the normal inertia synchronous condenser mode 300 to each of the other modes. In the example embodiment, power system 100 is switched to the normal inertia power plant mode 200 by operating first drive motor 142 to synchronize turbine shaft 134 with first clutch assembly 120, and then closing first clutch assembly 120. In the example embodiment, power system 100 is switched to the high inertia power plant mode 400 by operating second drive motor 148 to synchronize flywheel shaft 146 with second clutch assembly 124, and then closing second clutch assembly 124, and also by operating first drive motor 142 to synchronize turbine shaft 134 with first clutch assembly 120, and then closing first clutch assembly 120. Additionally, in the example embodiment, power system 100 is switched to the high inertia condenser mode 500 by operating second drive motor 148 to synchronize flywheel shaft 146 with second clutch assembly 124, and then closing second clutch assembly 124.

The third row of first table 602 illustrates procedures for switching from operation in the high inertia power mode 400 to each of the other modes. In the example embodiment, power system 100 is switched to the normal inertia power mode 200 by opening second clutch assembly 124 (e.g., as shown in FIG. 2). In the example embodiment, power system 100 is switched to the normal inertia synchronous condenser mode 300 by opening both first clutch assembly 120 and second clutch assembly 124. In the example embodiment, power system 100 is switched to the high inertia synchronous condenser mode 500 by opening first clutch assembly 120.

The fourth row of first table 602 illustrates procedures for switching from operation in the high inertia condenser mode 500 to each of the other modes. In the example embodiment, power system 100 is switched to the normal inertia power plant mode 200 by opening second clutch assembly 124 and also by operating first drive motor 142 to synchronize turbine shaft 134 with first clutch assembly 120, and then closing first clutch assembly 120. In the example embodiment, power system 100 is switched to the normal inertia synchronous condenser mode 300 by opening second clutch assembly 124. Additionally, in the example embodiment, power system 100 is switched to the high inertia power plant mode 400 by operating first drive motor 142 to synchronize turbine shaft 134 with first clutch assembly 120, and then closing first clutch assembly 120.

In alternative embodiments, when generator shaft 116 is rotating, first and/or second clutch assemblies 120, 124 may be coupled to generator shaft 116 by reducing the speed of the generator shaft 116. For example, in some such embodiments, procedure D may alternatively include reducing the speed of generator shaft 116 to a turning gear speed and then closing second clutch assembly 124. Likewise, procedure E may alternatively include reducing the speed of generator shaft 116 to the turning gear speed and then closing first clutch assembly 120.

Additionally, or alternatively, power plant 102 may be switched from any one of the modes by powering down generator 114 and adjusting the clutch assemblies 120, 124 as described above. In other embodiments, one or more of first clutch assembly 120 and second clutch assembly 124 may include a bolted coupler (not shown). In some such embodiments, the clutch assemblies 120, 124 are not transitioned by controller 160 but rather by manually coupling/uncoupling (e.g., by an operator) the bolted coupler. Moreover, in some embodiments, controller 160 is further configured to control operations of additional subsystems of at least one of inertia assembly 108, generator assembly 106, and turbine assembly 104.

Figure 7:
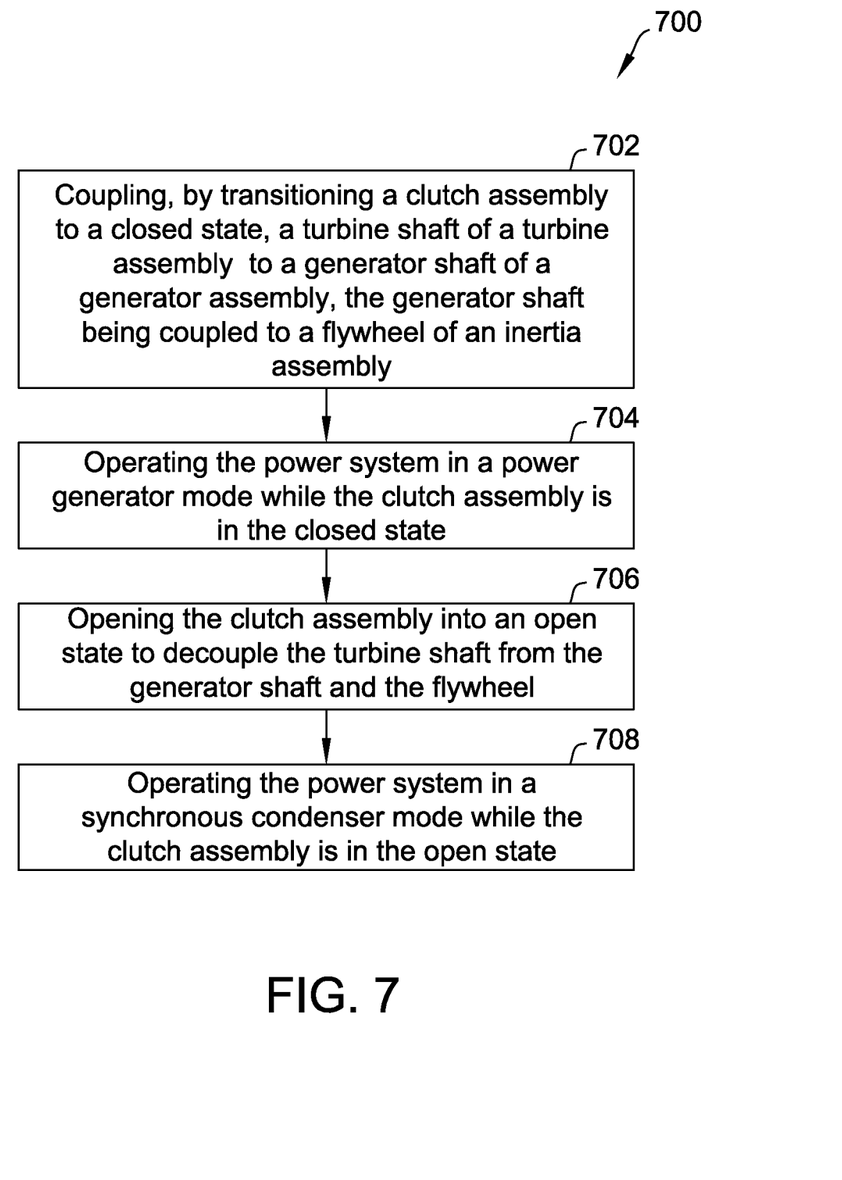
FIG. 7 is a flow diagram of an example method of operating a power system, such as the power system shown in FIGS. 1-5.

FIG. 7 is a flow diagram of an example method 700 of operating a power system. In the example embodiment, method 700 includes coupling 702, by transitioning a clutch assembly (e.g., clutch assembly 120) to a closed state, a turbine shaft of a turbine assembly to a generator shaft of a generator assembly, the generator shaft being coupled to a flywheel of an inertia assembly. Method further includes operating 704 the power system in a power generation mode while the clutch assembly is in the closed state. Method further includes opening 706 the clutch assembly into an open state to decouple the turbine shaft from the generator shaft and the flywheel. Method further includes operating 708 the power system in a synchronous condenser mode while the clutch assembly is in the open state.

The above described embodiments relate to a power system that includes an inertia assembly and a clutch assembly operable to transition the power system between a power generation mode and a synchronous condenser mode. Specifically, in the example embodiment, the power system includes a turbine assembly including a turbine and a turbine shaft, a generator assembly including a generator and a generator shaft, and an inertia assembly including a flywheel coupled to the generator shaft. A clutch assembly is also provided for selectively coupling the turbine shaft to the generator shaft. The clutch assembly is transitionable between a closed state, in which the turbine shaft is coupled to the generator shaft, and an open state in which the turbine shaft is decoupled from the generator shaft. The power system is operable in a power generation mode when the clutch assembly is in the closed state and a synchronous condenser mode when the clutch assembly is in the open state.

In the example embodiment, the power system may be selectively operated in a power generation mode or a synchronous condenser mode by controlling the clutch assembly. The clutch assembly couples the turbine shaft to the generator shaft when the power system is in the power generation mode and is controllable to decouple the turbine shaft from the generator to operate the power system in a synchronous condenser mode. Furthermore, the inertia assembly is able to provide increased inertia to the grid. Thus the power systems provide flexibility to operate the power system in different modes according to the changing needs of the grid.

Additionally, some example technical effects of the systems and methods described herein includes at least one of: (a) improved functionality of power systems to correspond to the needs of an electrical grid; (b) increased inertia of power systems without requiring implementation of separate dedicated inertia units; (c) reduced operating cost and materials by reducing or eliminating a need for separate facilities to provide power generation and synchronous condenser functionality; and (d) increasing power system efficiency.

Further aspects of the present disclosure are provided by the subject matter of the following clauses:

1. A power system comprising: a turbine assembly comprising a turbine and a turbine shaft; a generator assembly comprising a generator and a generator shaft; an inertia assembly comprising a flywheel coupled to said generator shaft; and a clutch assembly for coupling said turbine shaft to said generator shaft, said clutch assembly being transitionable between a closed state, in which said turbine shaft is coupled to said generator shaft, and an open state, in which said turbine shaft is decoupled from said generator shaft, wherein said power system is operable in a power generation mode when said clutch assembly is in the closed state and a synchronous condenser mode when said clutch assembly is in the open state.

2. The power system according to any preceding clause, wherein said inertia assembly further comprises a flywheel shaft coupled to said flywheel and said generator shaft.

3. The power system according to any preceding clause, wherein said generator shaft comprises a first end and a second end opposite said first end, wherein said clutch assembly is coupled to said generator shaft at said first end, and wherein said flywheel shaft is coupled to said generator shaft at said second end.

4. The power system according to any preceding clause, wherein said clutch assembly is a first clutch assembly, and wherein said power system further comprises a second clutch assembly for coupling said flywheel shaft to said generator shaft.

5. The power system according to any preceding clause further comprising a controller coupled in communication with said first clutch assembly and said second clutch assembly, said controller configured to control a state of said first clutch assembly and said second clutch assembly to switch said power system between at least three of: a standard inertia power generation mode, a high inertia power generation mode, a standard inertia synchronous condenser mode, and a high inertia synchronous condenser mode.

6. The power system according to any preceding clause, wherein said power system has a first inertia constant when operating in the standard inertia power generation mode and a second inertia constant when operating in the high inertia power generation mode, the second inertia constant being greater than the first inertia constant by at least a factor of 1.25.

7. The power system according to any preceding clause, wherein the second inertia constant is greater than the first inertia constant by a factor of 2.

8. The power system according to any preceding clause, wherein said turbine assembly further comprises a drive motor coupled to said turbine shaft, said drive motor is operable to drive rotation of said turbine shaft up to a synchronization speed with said generator shaft to transition said power system from the synchronous condenser mode to the power generation mode.

9. The power system according to any preceding clause, wherein, when said power system is operating in the synchronous condenser mode, said clutch assembly is operable to transition from the open state to the closed state to switch said power system from the synchronous condenser mode to the power generation mode.

10. The power system according to any preceding clause, wherein said power system is configured to switch from the synchronous condenser mode to the power generation mode without slowing rotation of said generator shaft.

11. The power system according to any preceding clause, wherein said clutch assembly further comprises a first steady bearing coupled to said generator shaft, a second steady bearing coupled to said turbine shaft, a lockable clutch, and a turning gear.

12. The power system according to any preceding clause, wherein said generator assembly further comprises: an excitation system; and an excitation ring coupled to said generator shaft, said excitation ring configured to receive current generated from said excitation system.

13. A method of operating a power system comprising: coupling, by transitioning a clutch assembly to a closed state, a turbine shaft of a turbine assembly to a generator shaft of a generator assembly, the generator shaft being coupled to a flywheel of an inertia assembly; operating the power system in a power generation mode while the clutch assembly is in the closed state; opening the clutch assembly into an open state to decouple the turbine shaft from the generator shaft and the flywheel; and operating the power system in a synchronous condenser mode while the clutch assembly is in the open state.

14. The method according to any preceding clause, further comprising closing, while the power system is being operated in the synchronous condenser mode, the clutch assembly to couple the turbine shaft to the generator shaft and switch the power system to the power generation mode.

15. The method according to any preceding clause further comprising driving, prior to said closing, rotation of the turbine shaft, by a drive motor coupled to the turbine shaft, to match a rotational velocity of the generator shaft.

16. The method according to any preceding clause, wherein the inertia assembly further includes a flywheel shaft coupled to the flywheel and the generator shaft, the generator shaft including a first end and a second end opposite said first end, wherein the clutch assembly couples the generator shaft to the turbine shaft at the first end of the generator shaft, said method further comprising coupling the flywheel shaft to the generator shaft at the second end.

17. The method according to any preceding clause wherein the inertia assembly further includes a flywheel shaft coupled to the flywheel and the generator shaft, wherein the clutch assembly is a first clutch assembly, said method further comprising coupling the flywheel shaft to the generator shaft via a second clutch assembly.

18. The method according to any preceding clause further comprising switching the power system between at least three of: a standard inertia power generation mode, a high inertia power generation mode, a standard inertia synchronous condenser mode, and a high inertia synchronous condenser mode.

19. The method according to any preceding clause, wherein the power system has a first inertia constant when operating in the standard inertia power generation mode and a second inertia constant when operating in the high inertia power generation mode, the second inertia constant being greater than the first inertia constant by at least a factor of 1.25.

20. A power system comprising: a turbine assembly comprising a turbine and a turbine shaft; a generator assembly comprising a generator and a generator shaft, said generator shaft extending from a first end to a second, opposed end; an inertia assembly comprising a flywheel coupled to a flywheel shaft; a first clutch assembly operable to couple said turbine shaft to said first end of said generator shaft; and a second clutch assembly operable to couple said flywheel shaft to said second end of said generator shaft, wherein said power system is operable in a power generation mode when said first clutch assembly is closed and a synchronous condenser mode when said first clutch assembly is open.

The above description is meant to be exemplary only, and one skilled in the art will recognize that changes may be made to the embodiments described without departing from the scope of the disclosure disclosed. Modifications, which fall within the scope of the present disclosure, will be apparent to those skilled in the art, in light of a review of this disclosure, and such modifications are intended to fall within the appended claims.

Example embodiments of power systems are described above in detail. The systems and methods described herein are not limited to the specific embodiments described herein, but rather, steps of the methods may be utilized independently and separately from other steps described herein. For example, the methods described herein are not limited to practice with the cleaning of gas turbine engine components as described herein. Rather, embodiments of the disclosure can be implemented and utilized in connection with any application that includes power generation via rotating components.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

While the disclosure has been described in terms of various specific embodiments, those skilled in the art will recognize that the disclosure can be practiced with modification within the spirit and scope of the claims.

What is claimed is:

1. A power system comprising:
   a turbine assembly comprising a turbine and a turbine shaft;
   a generator assembly comprising a generator and a generator shaft, the generator shaft extending from a first end to a second end;
   an inertia assembly comprising a flywheel shaft and a flywheel coupled to said flywheel shaft, said flywheel shaft coupled to said generator shaft at said second end; and
   a first clutch assembly for coupling said turbine shaft to said generator shaft at said first end, said first clutch assembly being transitionable between a closed state, in which said turbine shaft is coupled to said generator shaft, and an open state, in which said turbine shaft is decoupled from said generator shaft, wherein said power system is operable in a power generation mode when said first clutch assembly is in the closed state and a synchronous condenser mode when said first clutch assembly is in the open state; and
   a second clutch assembly for coupling said flywheel shaft to said generator shaft, said second clutch assembly enabling operation of said power system in a standard inertia synchronous condenser mode and a high inertia synchronous condenser mode, wherein said power system has a first inertia constant when operating in the standard inertia synchronous condenser mode and a second inertia constant when operating in the high inertia synchronous condenser mode, the second inertia constant being greater than the first inertia constant by at least a factor of 2.5.

2. The power system of claim 1 further comprising a controller coupled in communication with said first clutch assembly and said second clutch assembly, said controller configured to control a state of said first clutch assembly and said second clutch assembly to switch said power system between at least three of: a standard inertia power generation mode, a high inertia power generation mode, the standard inertia synchronous condenser mode, and the high inertia synchronous condenser mode.

3. The power system of claim 2, wherein said power system has a third inertia constant when operating in the standard inertia power generation mode and a fourth inertia constant when operating in the high inertia power generation mode, the fourth inertia constant being greater than the third inertia constant by at least a factor of 1.25.

4. The power system of claim 3, wherein the third inertia constant is greater than the fourth inertia constant by a factor of 2.

5. The power system of claim 1, wherein said turbine assembly further comprises a drive motor coupled to said turbine shaft, said drive motor is operable to drive rotation of said turbine shaft up to a synchronization speed with said generator shaft to transition said power system from the synchronous condenser mode to the power generation mode.

6. The power system of claim 1, wherein, when said power system is operating in the synchronous condenser mode, said first clutch assembly is operable to transition from the open state to the closed state to switch said power system from the synchronous condenser mode to the power generation mode.

7. The power system of claim 1, wherein said power system is configured to switch from the synchronous condenser mode to the power generation mode without slowing rotation of said generator shaft.

8. The power system of claim 1, wherein said first clutch assembly further comprises a first steady bearing coupled to said generator shaft, a second steady bearing coupled to said turbine shaft, a lockable clutch, and a turning gear.

9. The power system of claim 1, wherein said generator assembly further comprises:
an excitation system; and
an excitation ring coupled to said generator shaft, said excitation ring configured to receive current generated from said excitation system.

10. The power system of claim 1, wherein said second clutch assembly enables operation of said power system in a standard inertia power generation mode and a high inertia power generation mode, wherein said power system has a first inertia constant when operating in the standard inertia power generation mode and a second inertia constant when operating in the high inertia power generation mode, the second inertia constant being greater than the first inertia constant by at least a factor of 1.25.

11. The power system of claim 1, wherein said flywheel is positioned on a first side of said generator and said turbine is positioned on a second side of said generator opposite said flywheel such that said generator is positioned between said flywheel and said turbine.

12. A method of operating a power system comprising:
coupling, by transitioning a first clutch assembly to a closed state, a turbine shaft of a turbine assembly to a first end of a generator shaft of a generator assembly;
coupling, by transitioning a second clutch assembly to a closed state, a flywheel shaft of an inertia assembly to a second end of the generator shaft at the second end, the inertia assembly further including a flywheel coupled to the flywheel shaft;
operating the power system in a power generation mode while the first clutch assembly is in the closed state;
opening the first clutch assembly into an open state to decouple the turbine shaft from the generator shaft and the flywheel; and
operating the power system in a synchronous condenser mode while the first clutch assembly is in the open state, wherein the second clutch assembly enables operation of the power system in a standard inertia synchronous condenser mode and a high inertia synchronous condenser mode, the power system having a first inertia constant when operating in the standard inertia synchronous condenser mode and a second inertia constant when operating in the high inertia synchronous condenser mode, the second inertia constant being greater than the first inertia constant by at least a factor of 2.5.

13. The method of claim 12, further comprising closing, while the power system is being operated in the synchronous condenser mode, the clutch assembly to couple the turbine shaft to the generator shaft and switch the power system to the power generation mode.

14. The method of claim 13 further comprising driving, prior to said closing, rotation of the turbine shaft, by a drive motor coupled to the turbine shaft, to match a rotational velocity of the generator shaft.

15. The method of claim 12 further comprising switching the power system between at least three of: a standard inertia power generation mode, a high inertia power generation mode, the standard inertia synchronous condenser mode, and the high inertia synchronous condenser mode.

16. The method of claim 15, wherein the power system has a third inertia constant when operating in the standard inertia power generation mode and a fourth inertia constant when operating in the high inertia power generation mode, the fourth inertia constant being greater than the third inertia constant by at least a factor of 1.25.

17. A power system comprising:
a turbine assembly comprising a turbine and a turbine shaft;
a generator assembly comprising a generator and a generator shaft, said generator shaft extending from a first end to a second, opposed end;
an inertia assembly comprising a flywheel coupled to a flywheel shaft;
a first clutch assembly operable to couple said turbine shaft to said first end of said generator shaft; and
a second clutch assembly operable to couple said flywheel shaft to said second end of said generator shaft, wherein said power system is operable in a power generation mode when said first clutch assembly is closed and a synchronous condenser mode when said first clutch assembly is open, said second clutch assembly enabling operation of said power system in a standard inertia power generation mode and a high inertia power generation mode, wherein said power system has a first inertia constant when operating in the standard inertia power generation mode and a second inertia constant when operating in the high inertia power generation mode, the second inertia constant being greater than the first inertia constant by at least a factor of 1.25.

18. The power system of claim 17, wherein said said second clutch assembly enables operation of said power system in a standard inertia synchronous condenser mode and a high inertia synchronous condenser mode, wherein said power system has a third inertia constant when operating in the standard inertia synchronous condenser mode and a fourth inertia constant when operating in the high inertia synchronous condenser mode, the fourth inertia constant being greater than the third inertia constant by at least a factor of 2.5.

* * * * *